United States Patent
Baker et al.

(10) Patent No.: US 8,638,734 B2
(45) Date of Patent: Jan. 28, 2014

(54) METHOD FOR SIGNALING RANDOM ACCESS CHANNELS

(75) Inventors: Matthew P. J. Baker, Canterbury (GB); Timothy J. Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 404 days.

(21) Appl. No.: 12/739,167

(22) PCT Filed: Oct. 27, 2008

(86) PCT No.: PCT/IB2008/054424
§ 371 (c)(1), (2), (4) Date: Apr. 22, 2010

(87) PCT Pub. No.: WO2009/057032
PCT Pub. Date: May 7, 2009

(65) Prior Publication Data
US 2010/0309856 A1  Dec. 9, 2010

(30) Foreign Application Priority Data

Oct. 31, 2007 (EP) .................................... 07301518
Jan. 8, 2008 (EP) .................................... 08300012

(51) Int. Cl.
H04W 4/00 (2009.01)
(52) U.S. Cl.
USPC ........................... 370/329; 370/312; 455/450
(58) Field of Classification Search
USPC .................. 370/320, 328, 329, 342; 455/450, 455/452.1, 509
See application file for complete search history.

(56) References Cited

U.S. PATENT DOCUMENTS

| | | | |
|---|---|---|---|
| 6,708,037 B1* | 3/2004 | Moulsley et al. | 455/452.1 |
| 2001/0026539 A1* | 10/2001 | Kornprobst et al. | 370/329 |
| 2002/0041578 A1* | 4/2002 | Kim et al. | 370/335 |
| 2007/0047513 A1 | 3/2007 | Anderson | |
| 2007/0147310 A1* | 6/2007 | Cai | 370/335 |
| 2008/0101305 A1* | 5/2008 | Cave et al. | 370/336 |
| 2008/0225785 A1* | 9/2008 | Wang et al. | 370/329 |
| 2009/0041240 A1* | 2/2009 | Parkvall et al. | 380/247 |
| 2009/0325585 A1* | 12/2009 | Farajidana et al. | 455/450 |
| 2010/0182974 A1* | 7/2010 | Barraclough et al. | 370/329 |
| 2011/0019655 A1* | 1/2011 | Hakola | 370/342 |

* cited by examiner

Primary Examiner — Hoon J Chung

(57) ABSTRACT

The invention provides a method for efficiently defining E-RACH resources at least partly with reference to R99 RACH resources. This is achieved such that very little additional signaling is required on the BCH. E-RACH resources may be efficiently defined by signaled or predetermined differences from the R99 RACH resources. Resources for each PRACH are broadcast using the BCH. However, some UEs are configured to use E-RACH, for example by means of higher-layer signaling. In one embodiment, the resources available for each E-RACH for the configured UEs are given by the same set of signatures but the scrambling code and sub-channels are different. In another embodiment, the resources available for each E-RACH for the configured UEs are given by the same set of scrambling codes, but the signatures and sub-channels are different. In a typical, but not exclusive embodiment, the invention is applied in UMTS WCDMA.

6 Claims, 1 Drawing Sheet

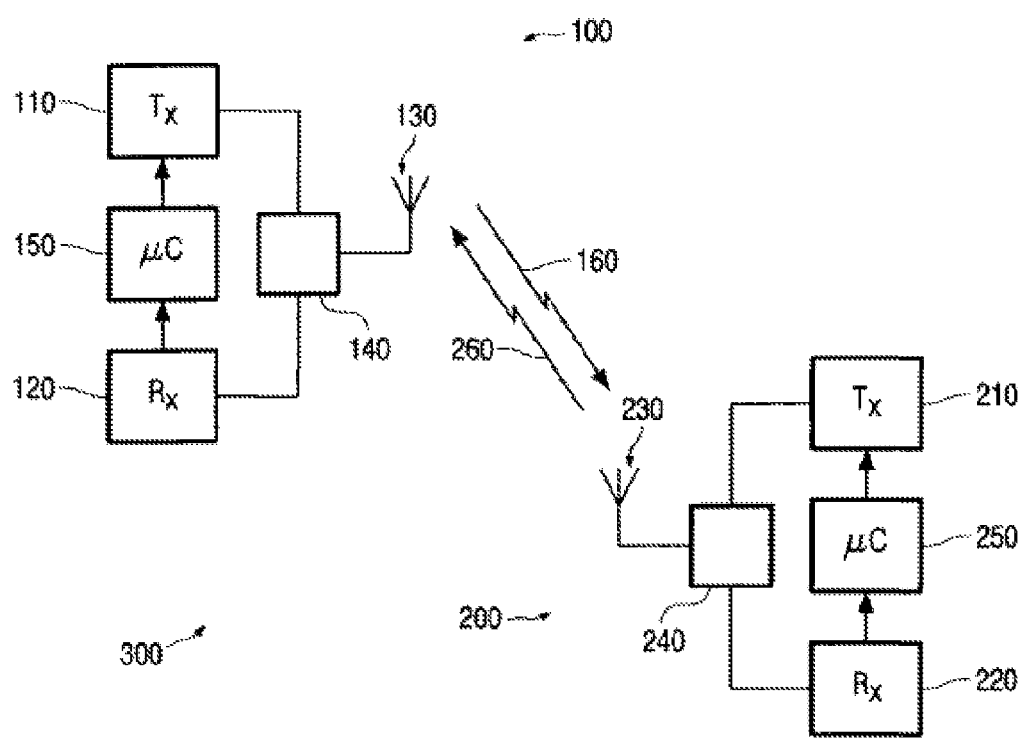

METHOD FOR SIGNALING RANDOM ACCESS CHANNELS

FIELD OF THE INVENTION

This invention relates to a method for signalling Access Channels, like random access channels, a primary station and a secondary station implementing such a method. This invention concerns more specifically mobile networks like GSM, or UMTS or UMTS LTE networks.

BACKGROUND OF THE INVENTION

In UMTS WCDMA there is a mechanism defined for Random Access transmission in the uplink. The User Equipment UE (namely the mobile station) transmits a randomly-selected preamble signal characterised by:

Signature sequence (i.e. bit sequence)
Scrambling code,
Sub-channel (i.e. timing of the access slot in the frame)

If the base station receives the signature it acknowledges it on the Acquisition Indicator Channel (AICH). If the UE receives a positive acknowledgement it transmits a message part on a RACH data channel.

If the UE does not receive an acknowledgement it can make another attempt. The probability of collision depends on the number of Signature sequences, Scrambling codes, Access slots from which the UEs make their selection for the randomly-selected preamble signal.

Currently in 3GPP it is proposed that UEs can be configured to use a new mechanism, which is similar to RACH. For the purpose of this invention, the main difference is that the data transmission uses a high-speed uplink packet data channel, known as Enhanced Dedicated Channel (E-DCH), instead of a single short message associated directly with the RACH preamble. Unlike the RACH message, the E-DCH is characterised by power control, rate control, hybrid ARQ and the ability to transmit high data rates for an indefinite length of time, but in practice the detailed characteristics are not relevant to this invention.

For convenience we can refer to the existing RACH as "R99 RACH" and the new scheme as "E-RACH".

The resources from which the UE is permitted to make a random selection for the R99 RACH preamble signal transmission are broadcast on a broadcast channel (BCH) in each cell. The R99 RACH parameters which are signalled on the BCH are included for reference in the table below. This information is provided for one of more PRACHs (Physical RACHs):

| Information Element/Group name | Need | Multi | Type and reference | Semantics description | Version |
|---|---|---|---|---|---|
| >>Available Signature | MP | | Bit string (16) | Each bit indicates availability for a signature, where the signatures are numbered "signature 0" up to "signature 15". The value 1 of a bit indicates that the corresponding signature is available and the value 0 that it is not available. | |
| >>Preamble scrambling code number | MP | | Integer (0 ... 15) | Identification of scrambling code] | |
| >>Available Sub Channel Number | MP | | Bit string (12) | Each bit indicates availability for a subchannel, where the subchannels are numbered "subchannel 0" to "subchannel 11". The value 1 of a bit indicates that the corresponding subchannel is available and the value 0 indicates that it is not available. | |

This information comprises a relatively large number of bits which have to be transmitted with sufficient power to be received throughout the cell. This represents a high overhead.

SUMMARY OF THE INVENTION

One object of the invention is to solve the problem of how to define and signal the resources available for E-RACH preamble selection without causing a further large increase in the amount of broadcast signalling in each cell.

In accordance with a first aspect of the invention, a method is proposed for communicating between a primary station and a secondary station comprising a step of signalling two random access channels of different types based on a difference of resources for the two random access channels.

These and other aspects of the invention will be apparent from and will be elucidated with reference to the embodiments described hereinafter.

BRIEF DESCRIPTION OF THE DRAWING

The present invention will now be described in more detail, by way of example, with reference to the accompanying drawing, wherein:

FIG. 1 is a block diagram of a system in which is implemented the invention.

DETAILED DESCRIPTION OF THE INVENTION

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 or an antenna array comprising a plurality of antennas, by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 or an antenna array comprising a plurality of antennas, by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

There are a couple of possibilities for resource definition:
The resources for E-RACH (i.e. Signature sequence, Scrambling code, sub-channel) could be provided by using some of those available for R99 RACH. However, this would have the effect of raising the probability of collision (assuming no reduction in R99 RACH access attempts). This approach is already discussed in 3GPP.
The resources for E-RACH are defined in addition to those for R99 RACH (i.e. one or more of the sets of Signature sequence, Scrambling code or Access slot are different to the set available for R99 RACH).

It should also be noted that the signalling of resources E-RACH should avoid disturbing the signalling to legacy terminals, which are not aware of E-RACH. This could be done for E-RACH by repeating the kind of signalling defined for R99 RACH and transmitted on the BCH (Broadcast Control Channel). However, this would imply a significant extra load on the BCH, which is undesirable. Therefore there will be some interest in a more efficient method of signalling.

The invention is based on the recognition that E-RACH resources can be defined efficiently at least partly with reference to the R99 RACH resources. This can be done in such a way that no (or very little) additional signalling is required on the BCH.

In general the invention involves indicating the E-RACH resources by means of a signalled or predetermined difference from the R99 RACH resources.

If the difference is fully predetermined then no additional signalling is required.

In practice a combination of signalling and predetermination may be used.

In a typical embodiment, the invention is applied in UMTS WCDMA. Resources for each PRACH are broadcast using the BCH. Some UEs are configured to use E-RACH, for example by means of higher-layer signalling.

In a preferred embodiment, the resources available for E-RACH for the configured UEs are given by the same set(s) of signatures and sub-channels as for each PRACH, but the scrambling code is different.

The availability (or not) of E-RACH resources may therefore be indicated by a single broadcast bit. If the bit is set, the scrambling code is predetermined as being one of a group of scrambling codes pre-defined for E-RACH. The specific scrambling code(s) for E-RACH is (are) determined by a pre-defined one-to-one mapping from the PRACH scrambling code(s).

As a variation of this embodiment the scrambling code used by the UE for E-RACH is signalled, or is UE-specific.

In another embodiment, the invention may comprise signalling a difference in the set of signatures and/or the set of sub-channels, for example by adding one or more signatures and/or sub-channels to the set available for R99 RACH, or by removing one or more signatures and/or sub-channels from the set available for R99 RACH.

In a specific such embodiment based on WCDMA, the resources for E-RACH are the same as for each PRACH, except that the bit-map indicating the available signatures for each PRACH is inverted to indicate the signatures for E-RACH. This has the advantage that no new functionality is needed at the base station, and the resources for R99 RACH and E-RACH are automatically distinguishable from the signature. In a variation of this embodiment the bit map of PRACH sub-channels is inverted to give the E-RACH sub-channels.

The E-RACH resources will need to be broadcast in the cell. However, it is important to avoid excessive additional loading on the BCH, and efficient ways of signalling should be found. Preferably, it should not be necessary to duplicate for E-RACH all the PRACH system information which is already present on the BCH.

Moreover, the signalling of E-RACH resources must not affect the signalling for R99 RACH access, so that legacy UEs are unaffected.

Having defined an additional set of scrambling codes for E-RACH, one possibility for a low-overhead way to broadcast the E-RACH resource allocation would be to assume that the same resources are available in terms of signatures and subchannels as for R99 RACH, and simply indicate the new scrambling code(s) that are to be used for E-RACH. Legacy UEs would ignore this information, while Release 8 UEs would read the normal PRACH system information to find out which signatures and sub-channels should be used with the new scrambling code(s).

According to another aspect of the invention, joint coding of multiple differences between resources for RACH and E-RACH is used. This aspect of the invention is based on the recognition that an information element indicating a first parameter describing the E-RACH resources could not take the same value as for a RACH resource if all other parameters describing the resources were the same between E-RACH and RACH (otherwise the same resources would be described for both E-RACH and RACH). The value of the E-RACH resource parameter which is the same as the RACH resource parameter can therefore be reinterpreted to indicate that a different resource parameter is modified for E-RACH relative to RACH. The different resource parameter which is modified, and the way in which it is modified, can be signalled separately or predetermined. In one embodiment, the first parameter indicates the identity of a scrambling code to be used for E-RACH. If this parameter indicates a scrambling code configured (in the same message, or in some embodiments in a different message) for RACH, the parameter is defined to mean that the set of signatures for E-RACH in combination with the said scrambling code is different from the set of signatures for RACH in combination with the said scrambling code. In a preferred case of this embodiment, the difference between the sets of signatures is predetermined such that the two sets are mutually exclusive and together comprise the whole set of available signatures—in other words, that a bit map describing the set of available signatures for E-RACH is obtained by inverting the bit map describing the set of available signatures for RACH. An example of this embodiment is given below:

| Information Element/Group name | Need | Multi | Type and reference | Semantics description | Version |
|---|---|---|---|---|---|
| CHOICE mode | MP | | | | |
| >FDD | | | | | |
| >>Available Signature | MP | | Bit string (16) | Each bit indicates availability for a signature, where the signatures are numbered "signature 0" up to "signature 15". The value 1 of a bit indicates that the corresponding signature is available and the value 0 that it is not available. | |
| >>Available SF | MP | | Integer (32, 64, 128, 256) | In chips per symbol Defines the minimum allowed SF (i.e. the maximum rate) | |
| >>Preamble scrambling code number | MP | | Integer (0 . . . 15) | Identification of scrambling code see [28] | |
| >>PRACH resource allocation for E-DCH in CELL_FACH | OP | | Integer (0 . . . 15) | Identification of scrambling code for PRACH for E-DCH in CELL_FACH see [28]. If the value of this IE is equal to Preamble scrambling code number, the available signatures for PRACH for E_DCH in CELL_FACH are derived by inverting the bit string for the IE Available Signature, otherwise the available signatures for PRACH for E_DCH in CELL_FACH are given directly by the bit string for the IE Available Signature. | Rel-8 |
| >>Puncturing Limit | MP | | Real (0.40 . . . 1.00 by step of 0.04) | | |
| >>Available Sub Channel Number | MP | | Bit string (12) | Each bit indicates availability for a subchannel, where the subchannels are numbered "subchannel 0" to "subchannel 11". The value 1 of a bit indicates that the corresponding subchannel is available and the value 0 indicates that it is not available. | |

In this example, the parameter "Preamble scrambling code number" indicates the scrambling code used for RACH, and the parameter "PRACH resource allocation for E-DCH in CELL_FACH" indicates the scrambling code used for E-RACH. Both parameters are integers which may take a value between 0 and 15. If the value of the parameter "PRACH resource allocation for E-DCH in CELL_FACH" is the same as the value of the parameter "Preamble scrambling code number", then the set of available signatures for E-RACH is obtained by inverting the bit string "Available Signature" for RACH, otherwise the set of signatures for E-RACH are the same as indicated by the bit string "Available Signature".

In another similar example, when RACH and E-RACH use different scrambling codes, the set of signatures could be determined independently (for example by signalling independent information elements).

The invention claimed is:

1. A method of communicating between a primary station and a secondary station over two random access channels of different types, the method comprising:
   signaling a first type random access channel having a first resource set;
   signaling a second type random access channel having a second resource set different from the first resource set;
   wherein the difference between the first and the second resource sets comprises a difference between at least one resource in the first resource set and at least one resource in the second resource set, wherein the first and second resource sets comprise at least one of: scrambling code and signature set and sub-channel or scrambling code and signature set or scrambling code and sub-channel or signature set and sub-channel;
   wherein the second resource set available for the second type random access channel comprise at least a portion of those resources not available for the first type random access channel out of a predetermined larger set; and
   wherein the second resource set available for the second type random access channel are obtained by inverting a bit-map describing the first resource set available for the first type random access channel.

2. The method of claim 1, wherein the difference between the first and the second resource sets is carried out by adding at least one of the scrambling code, the signature set and the sub-channel to the first resource set used for the first type random access channel.

3. The method of claim 1, wherein the signaling of the second type random access channel further comprises an indication of whether a difference of resources for the second type random access channel is available or not.

4. The method of claim 1, wherein the signaling of the first and the second type random access channels is broadcast.

5. The method of claim 1, wherein the signaling of the first type random access channel is broadcast.

6. A primary station for communicating with a secondary station over two random access channels of different types, comprising:
   a transmitter;
   a processor operative to:
   signaling a first type random access channel having a first resource set;
   signaling a second type random access channel having a second resource set different from the first resource set;
   wherein the difference between the first and the second resource sets comprises a difference between at least one resource in the first resource set and at least one resource in the second resource set, wherein the first and second resource sets comprise at least one of: scrambling code and signature set and sub-channel or scrambling code and signature set or scrambling code and sub-channel or signature set and sub-channel;
   wherein the second resource set available for the second type random access channel comprise at least a portion of those resources not available for the first type random access channel out of a predetermined larger set; and
   wherein the second resource set available for the second type random access channel are obtained by inverting a bit-map describing the first resource set available for the first type random access channel.

* * * * *